(12) United States Patent
Park et al.

(10) Patent No.: US 9,055,532 B2
(45) Date of Patent: Jun. 9, 2015

(54) APPARATUS AND METHOD FOR UPDATING SLPID OF A TERMINAL OPERATING IN SLEEP MODE IN A BROADBAND WIRELESS COMMUNICATIONS SYSTEM

(75) Inventors: Giwon Park, Gyeonggi-Do (KR); Kiseon Ryu, Gyeonggi-Do (KR); Youngsoo Yuk, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 266 days.

(21) Appl. No.: 13/279,216

(22) Filed: Oct. 21, 2011

(65) Prior Publication Data

US 2012/0099500 A1   Apr. 26, 2012

Related U.S. Application Data

(60) Provisional application No. 61/405,213, filed on Oct. 21, 2010.

(30) Foreign Application Priority Data

Jan. 10, 2011   (KR) .................. 10-2011-0002429

(51) Int. Cl.
*H04W 52/02* (2009.01)
*H04W 76/04* (2009.01)

(52) U.S. Cl.
CPC ........ *H04W 52/0235* (2013.01); *H04W 76/048* (2013.01)

(58) Field of Classification Search
CPC ................................................ H04W 52/0216
USPC ........................................................ 370/311
See application file for complete search history.

(56) References Cited

U.S. PATENT DOCUMENTS 8,090,342 B2 * 1/2012 Xu et al. .................... 455/404.1
2005/0049013 A1 * 3/2005 Chang et al. ................. 455/574
(Continued)

FOREIGN PATENT DOCUMENTS

| KR | 1020050044170 | 5/2005 |
| KR | 1020050120521 | 12/2005 |
| KR | 10-2006-0016718 | 2/2006 |

OTHER PUBLICATIONS

Chen Yih-Shen, "ASN.1 coding for Traffic Indication MAC Management Messages (16.2.3.25)" Mar. 25, 2009.*
(Continued)

*Primary Examiner* — Robert M Morlan
(74) *Attorney, Agent, or Firm* — Lee, Hong, Degerman, Kang & Waimey

(57) ABSTRACT

The present disclosure relates to an operation method of a base station for supporting a sleep mode in a broadband mobile communication system, and the method may include transmitting a sleep response message containing sleep identification information to the terminal during a sleep mode entry process; transmitting a traffic indication message containing updated sleep identification information to the terminal during a listening window when the sleep identification information is updated; receiving a traffic indication request message from the terminal subsequent to the listening window; and transmitting a traffic indication response message containing the updated sleep identification information to the terminal.

4 Claims, 5 Drawing Sheets

(56) References Cited

U.S. PATENT DOCUMENTS

| | | | |
|---|---|---|---|
| 2006/0039320 | A1* | 2/2006 | Kang et al. .................... 370/328 |
| 2006/0099953 | A1* | 5/2006 | Mansour ....................... 455/445 |
| 2009/0186595 | A1* | 7/2009 | Son et al. .................... 455/404.1 |
| 2010/0105351 | A1* | 4/2010 | Xu et al. ..................... 455/404.1 |
| 2010/0254293 | A1* | 10/2010 | Son et al. ....................... 370/311 |
| 2011/0053657 | A1* | 3/2011 | JI ................................. 455/574 |
| 2012/0208493 | A1* | 8/2012 | Park et al. ................... 455/404.2 |

OTHER PUBLICATIONS

Chen, et al., "ASN.1 coding for Traffic Indication MAC Management Messages (16.2.3.25)", IEEE C802.16m-10/0214, Mar. 2009, 5 pages.

Korean Intellectual Property Office Application Serial No. 10-2011-0002429, Office Action dated Jan. 28, 2013, 2 pages.

Korean Intellectual Property Office Application Serial No. 10-2011-0002429, Notice of Allowance dated Jan. 15, 2014, 2 pages.

* cited by examiner

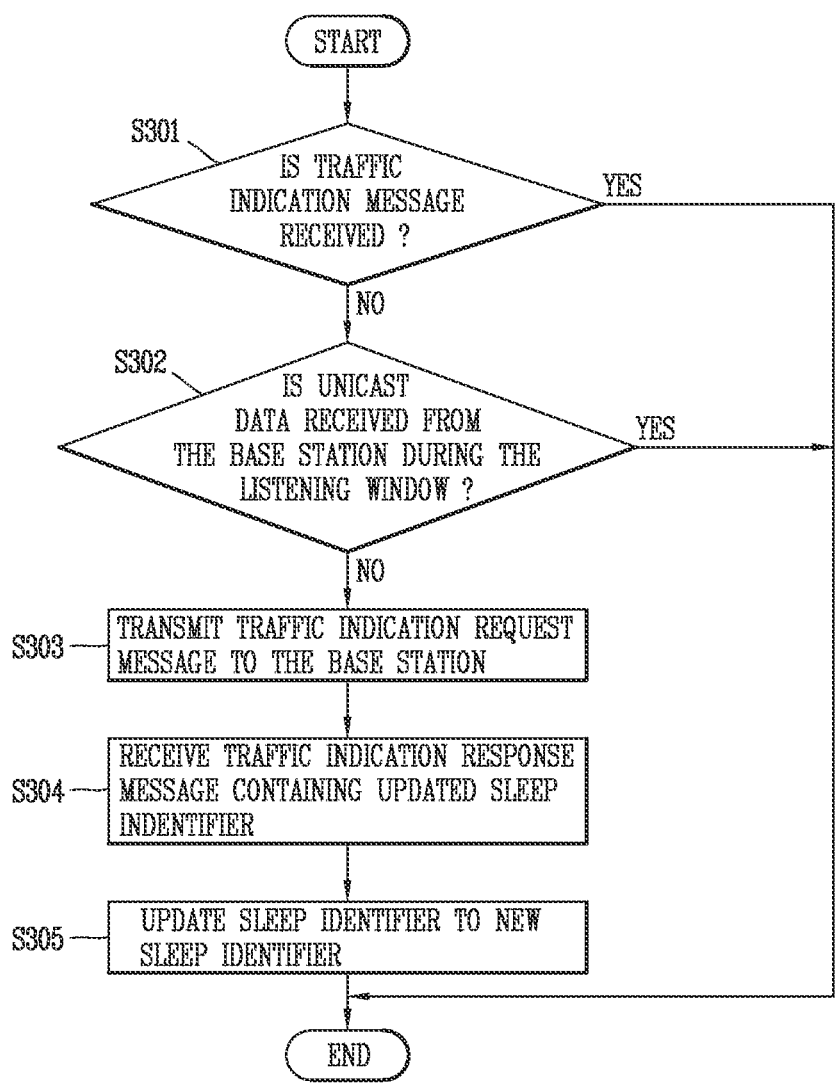

APPARATUS AND METHOD FOR UPDATING SLPID OF A TERMINAL OPERATING IN SLEEP MODE IN A BROADBAND WIRELESS COMMUNICATIONS SYSTEM

RELATED APPLICATION

Pursuant to 35 U.S.C. §119, this application claims the benefit of earlier filing date and right of priority to Korean Application No. 10-2011-0002429, filed on Jan. 10, 2011, and also claims the benefit of U.S. Provisional Application Ser. No. 61/405,213, filed on Oct. 21, 2010, the contents of which are all hereby incorporated by reference herein in their entirety.

BACKGROUND OF THE INVENTION

1. Field of the Invention

The present disclosure relates to a method and apparatus for updating a sleep identifier in a broadband wireless communication system, and more particularly, to a method and apparatus for updating a sleep identifier of the sleep mode terminal when a traffic indication message containing an updated sleep identifier has not been received.

2. Description of the Related Art

The issue of power consumption in a terminal may be a very important factor in a broadband wireless mobile communication system compared to other systems because the mobility of a terminal should be taken into consideration. A sleep mode operation between a terminal and a base station has been proposed as one of such methods for minimizing power consumption in a terminal.

In a sleep mode operation, a terminal requests to enter into a sleep mode if there exists no more traffic to be transmitted and/or received to and/or from a base station while performing a communication with the base station in an active mode, and receives a response to that request from the base station to change the state thereof to a sleep mode.

The terminal that has entered into a sleep mode state receives a message indicating whether there exists a traffic transferred from the base station during a sleep listening window, and determines that there exists no data traffic transmitted to a downlink when negative indication indicating that there exists no traffic is received.

Furthermore, if positive indication is received from the base station during the listening window, then the terminal determines that there exists data traffic transferred to a downlink, and initializes the current sleep cycle. At this time, the type of data traffic that can be received by a terminal may be a real time or non-real time service, and it has a feature that packet data transmitted and/or received to and/or from the terminal will have non-periodicity if a non-real time service is received such as short message, and packet data transmitted and/or received to and/or from the terminal will have periodicity if a real time service is received such as VoIP (Voice on IP).

FIG. 1 is a flow chart sequentially illustrating a typical sleep mode operation.

A terminal performs communication with a base station in a normal or active mode, and transmits a sleep-request (SLP-REQ) message for entering into a sleep mode to the base station if there exists no more traffic to be transmitted and/or received to and/or from the base station (S101).

The base station receives the SLP-REQ message from the terminal, transmits a sleep-response (SLP-RSP) message to the terminal in response to the SLP-REQ message (S102).

The SLP-RSP message may include a sleep mode parameter for operating the sleep mode of a terminal, such as a sleep cycle, a listening window, and the like. The terms, "listening section" and "sleep interval", used below shall have the same meaning as "listening window" and "sleep window", respectively.

According to circumstances, even without the sleep-request message of the terminal (S101), the base station may directly transmit an unsolicited SLP-RSP message to the terminal, thereby giving a command to allow the terminal to enter into a sleep mode.

The terminal that has received a SLP-RSP message from the base station changes the state to a sleep mode by referring to a sleep operating parameter to perform a sleep mode operation.

The sleep mode may include a sleep window (SW) incapable of receiving data and a listening window (LW) capable of receiving data.

In the sleep mode, the base station transmits a traffic-indication (TRF-IND) message to the terminal to indicate whether or not there exists traffic to be transferred to the terminal during a listening window (S103).

The TRF-IND message indicating the existence or non-existence of the traffic is set to positive indication if there exists traffic, but set to negative indication if there exists no traffic.

If a positive TRF-IND message is received, then the terminal transmits or receives the generated data traffic during the listening window (S104), and enters into the sleep window (SW) to perform a sleep mode operation.

SUMMARY OF THE INVENTION

An object of the present disclosure is to provide a method in which when a terminal being operated in a sleep mode is unable to receive a traffic indication message including an updated sleep identifier during a listening window of the sleep mode, a traffic indication message including an updated sleep identifier is transmitted, thereby allowing the terminal to correctly analyze a traffic indication message transmitted during the next sleep cycle.

According to the present disclosure, there is provide an operation method of a base station for supporting a sleep mode in a broadband mobile communication system, and the method may include transmitting a sleep response message containing sleep identification information to the terminal during a sleep mode entry process; transmitting a traffic indication message containing updated sleep identification information to the terminal during a listening window when the sleep identification information is updated; receiving a traffic indication request message from the terminal; and transmitting a traffic indication response message containing the updated sleep identification information to the terminal.

Furthermore, the method may be characterized in that the sleep identification information may be an identifier used to distinguish a terminal in a sleep mode.

Furthermore, the method may be characterized in that the updated sleep identification information consists of a pair of a sleep identifier (OLD SLPID) used by a terminal and a new sleep identifier (NEW SLPID) substituting for the sleep identifier used by the terminal.

Furthermore, the method may be characterized in that the traffic indication response message containing the new sleep identification information is transmitted when the sleep identification information is updated.

Furthermore, the method may be characterized in that the sleep identification information is updated after entering a sleep mode.

Furthermore, the method may be characterized in that the sleep identification information is updated when occurring an empty sleep identifier which is not assigned to any terminal among sleep identifiers assigned to a sleep identifier group.

Furthermore, according to the present disclosure, there is provided an operation method of a terminal for performing a sleep mode in a broadband mobile communication system, and the method may include receiving a sleep response message containing sleep identification information from a base station during a sleep mode entry process; transmitting a traffic indication request message to the base station subsequent to the listening window when a traffic indication message and unicast data are not received from the base station during the listening window; receiving a traffic indication response message containing new sleep identification information substituting for the sleep identification information from the base station; and updating the sleep identification information to the new sleep identification information based on the received traffic indication response message.

Furthermore, the method may be characterized by further including checking whether there is a traffic to be transmitted to the terminal based on the updated sleep identification information after receiving a traffic indication message during a sleep mode listening window subsequent to the listening window.

Furthermore, the method may be characterized in that the traffic indication message further includes the updated sleep identification information when the sleep identification information is updated.

Furthermore, according to the present disclosure, there is provided a terminal for performing a sleep mode in a broadband wireless communication system, and the terminal may include a central processing unit; a memory unit; and a radio frequency (RF) unit, wherein the radio frequency unit includes a transmission module configured to transmit radio signals; a reception module configured to receive radio signals; and a radio frequency controller configured to control the reception module for receiving a sleep response message containing sleep identification information from a base station during a sleep mode entry process, and control the transmission module for transmitting a traffic indication request message to the base station subsequent to the listening window when a traffic indication message and unicast data are not received from the base station during the listening window, and control the reception module for receiving a traffic indication response message containing new sleep identification information substituting for the sleep identification information from the base station, wherein the central processing unit extracts the new sleep identification information from the received traffic indication response message to update a sleep identifier previously assigned to the terminal to the extracted new sleep identification information.

Furthermore, the terminal may be characterized in that the new sleep identification information is contained in the traffic indication response message when the sleep identification information is updated.

Furthermore, there is provided a base station for supporting a sleep mode in a broadband wireless communication system, and the terminal may include a central processing unit; a memory unit; and a radio frequency (RF) unit, wherein the radio frequency unit includes a transmission module configured to transmit radio signals; a reception module configured to receive radio signals; and a radio frequency controller configured to control the transmission module for transmitting a sleep response message containing sleep identification information to the terminal during a sleep mode entry process and transmitting a traffic indication message containing updated sleep identification information to the terminal during a listening window when the sleep identification information is updated, and control the transmission module for transmitting a traffic indication response message containing the updated sleep identification information to the terminal when a traffic indication request message is received from the terminal through the reception module.

According to the present disclosure, a traffic indication response message containing an updated sleep identifier may be transmitted to a terminal, and thus even when the terminal is unable to receive a traffic indication message during a listening window, the terminal can correctly analyze a traffic indication message transmitted during the next sleep cycle, thereby allowing the terminal to smoothly perform a sleep mode operation.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a flow chart illustrating an operation method of a terminal for updating a sleep identifier when the terminal according to an embodiment of the present disclosure is unable to receive a traffic indication message;

DETAILED DESCRIPTION OF THE INVENTION

Figure 1:
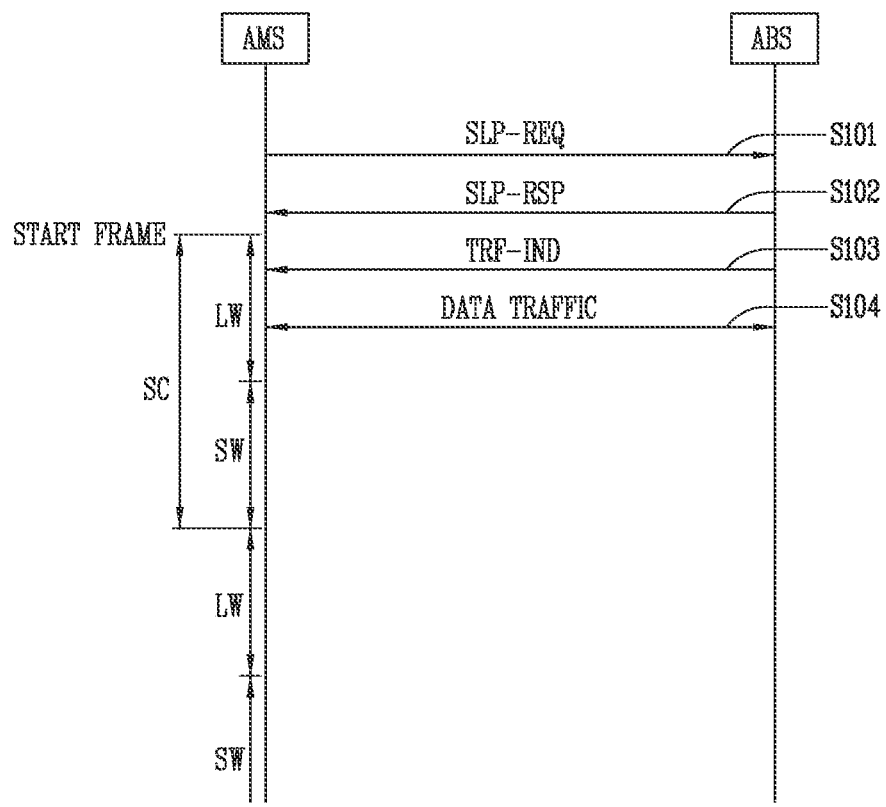
FIG. 1 is a flow chart sequentially illustrating a typical sleep mode operation.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Hereinafter, the term "device" herein is used with a meaning, commonly referred to as a user equipment (UE), a mobile equipment (ME), and a mobile station (MS). Furthermore, the device may be portable equipment such as a portable phone, a PDA, a smart phone, and a notebook, or non-portable equipment such as a PC, and a vehicle-loaded device.

According to the present disclosure, there is provided a method of updating a sleep identifier of the sleep mode terminal when the sleep mode terminal has not been able to receive a traffic indication message containing an updated sleep identifier.

First, prior to describing the method of updating a sleep identifier of the sleep mode terminal provided by the present disclosure, parameters and messages used in a sleep mode operation will be described below.

SLPID (Sleep IDentifier)

Sleep identifier is a value assigned to a terminal through a sleep response (SLP-RSP) message during the process of performing a state transition from an awake mode to a sleep mode, and a unique value is used only for terminals existing in a sleep mode. In other words, the sleep identifier is an identifier used to distinguish a terminal in a sleep mode state including a listening window.

Furthermore, if the terminal transits from a sleep mode to an awake mode, then a sleep identifier assigned to the terminal may be returned to a base station, and reused for another terminal to be transited to a sleep mode through a sleep response (SLP-RSP) message. Typically, the sleep identifier has a size of 10 bits, thereby supporting 1024 terminals which perform a sleep mode operation.

Traffic Indication (TRF-IND) Message

Traffic indication message, as a message transmitted from a base station to a terminal during a listening window of the sleep mode, is a message indicating that there exists packet data to be transmitted from the base station to the terminal.

The traffic indication message is a broadcasting message transmitted in a broadcasting scheme other than a SLP-REQ message and SLP-RSP message exchanged between a terminal and a base station during a sleep mode entry. The traffic indication message is a message indicating that there exists packet data to be transmitted from the base station to a predetermined terminal, and the terminal decodes the broadcast traffic indication message during the listening window to determine whether to transit to an awake mode or return to the sleep mode.

If the terminal transits to an awake mode, then the terminal may check frame sync, and request retransmission of lost packet data in the awake mode if a frame sequence number expected by the terminal is not identical.

Otherwise, if the terminal is unable to receive the traffic indication message during the listening window, or a value indicating positive indication is not specified even when the traffic indication message has been received, then the terminal may return to the sleep mode.

The format of a traffic indication (AAI-TRF-IND) message will be described with reference to the following Table 1.

TABLE 1

| Field | Size (bits) | Value/Description | Condition |
|---|---|---|---|
| AAI-TRF-IND message format( ) { | — | — | |
| FRMT | 1 | This indicates type of Traffic Indication in AAI-TRF-IND message. 0: It indicates the SLPID bitmap-based traffic indication 1: It indicates the SLPTD-based traffic indication | |
| Emergency Alert Indication | 1 | Used to indicate the presence of emergency information for supporting the emergency alert service 0b0: there is no emergency information 0b1: there is emergency information | |
| if(FMT == 0) { | — | — | |
| SLPID Group Indication Bitmap | 32 | It indicates the existence of each SLPID group N-th bit of SLPID-Group Indication Bitmap [MSB corresponds to N = 0] is allocated to SLPID Group that includes AMS with SLPID values from N*32 to N*32 + 31 0: There is no traffic for any of the 32 AMSs that belong to the SLPID-Group 1: There is traffic for at least one AMS in SLPID-Group. | |
| Traffic Indication Bitmap | N*32 | It indicates the traffic indication for 32 AMSs in each SLPID group Each Traffic Indication bitmap comprises multiples of 32-bit long Traffic Indication units. A Traffic Indication unit for 32 SLPIDs is added to MI-TRF-IND message whenever its SLPID Group is set to 1 32 bits of Traffic Indication Unit (starting from MSB) are allocated to AMS in the ascending order of their SLPID values: 0: Negative indication 1: Positive indication N = The number of '1' in SLPID Group Indication Bitmap (i.e. the number of SLPID Group which has positive traffic indication) | |

TABLE 1-continued

| Field | Size (bits) | Value/Description | Condition |
|---|---|---|---|
| } else {  | — | — | |
| Num_of_SLPIDs | 6 | It indicates the number of SLPID included in AAI-TRF-IND message 0~63 | |
| for (i = 0; i < Num_of_SLPIDs; i++) { | | | |

Referring to Table 1, parameters contained in the traffic indication message will be described.

(1) FRMT

FRMT indicates whether to use a sleep identifier bitmap or use a sleep identifier as a method of indicating whether or not there exists a traffic to be transmitted to a terminal in the sleep mode state.

Here, the sleep identifier (SLPID) bitmap is a set of indication index values assigned by one bit for each sleep identifier assigned to the terminal to distinguish terminals transited to a sleep mode state.

For example, it may represent traffic indication based on a sleep identifier bitmap when the FRMT parameter is set to "0", and may represent traffic indication based on a sleep identifier when the FRMT parameter is set to "1".

(2) Sleep Identifier (SLPID) Group Indication Bitmap

Sleep identifier (SLPID) group indication bitmap may denote whether or not a traffic is indicated to terminals belonging to each sleep identifier group.

The sleep identifier may have a value between 0 to 1023, and may be divided into 32 sleep identifier groups. Therefore, each sleep identifier group may have the following range.

Sleep identifier group #0 (the most significant bit) corresponds to sleep identifiers 0-31. Sleep identifier group #1 corresponds to sleep identifiers 32-63, ... and Sleep identifier group #31 corresponds to sleep identifiers 992-1023. A sleep identifier group indication bitmap is a 32-bit field in which each bit is assigned to each sleep identifier group. In other words, the most significant bit in the relevant field is assigned to sleep identifier group #0, and the next bit is assigned to sleep identifier group #1.

Accordingly, the n-th bit (bn) (here, n=0-31) of a sleep identifier group indication bitmap may be analyzed in the following method. In other words, bn=0 may denote that there is no traffic for all 32 terminals belonging to sleep identifier group #n. In this case, terminals belonging to sleep identifier group #n may return to a sleep mode.

Furthermore, bn=1 may denote that there exist a traffic for one or more terminals belonging to sleep identifier group #n. In this case, a terminal in a sleep mode belonging to sleep identifier group #n may read its own traffic indication message from a traffic indication message.

(3) Traffic Indication Bitmap

Traffic indication bitmap consists of a plurality of 32-bit long traffic indication units for all sleep identifier groups for which the sleep identifier group indication bit is set to "1"

Bits (starting from the most significant bit) in the 32-bit traffic indication unit are assigned to terminals in the ascending order of sleep identifiers. Each bit may transmit traffic information for the relevant terminal.

For example, "0" may denote negative indication, and "1" may denote positive indication.

(4) Number of Sleep Identifiers (Num_of_SLPIDs)

It may indicate the number of sleep identifiers having positive indication.

(5) Sleep Identifier (SLPID)

A sleep identifier for a terminal having a traffic to be transmitted via downlink.

(6) Traffic Location Indicator Bitmap

Each bit may correspond to a sleep identifier having positive traffic indication, and indicate whether the relevant data exists only at the latter-half part (after a half of the listening window) of the listening window.

Furthermore, a traffic indication message may further include a sleep identifier update parameter.

(7) Sleep Identifier Update

Sleep identifier update parameter provides a fast method for changing a sleep identifier used by a sleep mode terminal.

The sleep identifier update parameter indicates a new sleep identifier substituting for a previous sleep identifier. The sleep identifier update parameter consists of a pair of a sleep identifier (OLD SLPID) currently used by terminals and a new sleep identifier (NEW SLPID), and may include a plurality of the pairs. The sleep identifier update parameter will be applied from the next listening window.

Hereinafter, a sleep mode operation in case where a terminal receives a traffic indication (TRF-IND) message transmitted from a base station will be described in brief.

A base station may transmit a traffic indication (TRF-IND) message for instructing whether there is a traffic to be transmitted to a terminal during a listening window (LW) of the sleep cycle.

Here, for the traffic indication, a traffic indication message flag (TIMF) contained in a sleep request and sleep response (SLP-REQ/RSP) message is set to "1", and it may be enabled when a base station transmits a traffic indication message to a terminal or terminals belonging to one group.

Furthermore, the base station transmits a traffic indication message containing a sleep identifier (OLD SLPID) currently used by a terminal and an updated new sleep identifier (NEW SLPID) to the terminal when the sleep identifier assigned to the terminal is updated through a sleep response (SLP-RSP) message.

Here, updating a sleep identifier may denote reassigning a sleep identifier assigned to a terminal existing in a sleep mode at an initial stage of the sleep mode entry process to a new sleep identifier while performing a sleep mode procedure.

Whether or not sleep identifier update is required may be determined by checking whether there exists an empty sleep identifier (SLPID) in a sleep identifier list having a number less than that of a current sleep identifier of the terminal in a list of whole identifiers managed by the base station. The empty sleep identifier may correspond to an identifier that has been previously assigned to and used by another terminal but returned to the base station when a mode transition to an awake mode is carried out. If there exist a plurality of empty identifiers, then an identifier having the least number of them may be newly assigned to be updated.

Through the foregoing method, a terminal may not be fixed to an initially assigned sleep identifier but may be continuously updated to have an identifier having a number less than that of the initially assigned sleep identifier.

For example, when the least sleep identifier that can be assigned to a terminal in a sleep mode by the base station is 1, and an initially assigned sleep identifier to the terminal is 99, if there exists an unused sleep identifier between the sleep identifier 99 and the sleep identifier 1, then the least number of them will be newly assigned to the terminal.

As a result of the determination, if updating a sleep identifier of the terminal is required by the base station, then a sleep identifier of the terminal may be updated.

Furthermore, whether or not updating a sleep identifier is required may be determined by checking whether or not there exists any empty sleep identifier among the sleep identifiers of terminals belonging to each SLPID group.

In other words, when the SLPIDs of sleep mode terminals are dispersed for each sleep identifier (SLPID) group, the base station may perform sleep identifier update to assign the SLPIDs dispersed for the each SLPID group to the same sleep identifier group.

The SLPID group indication bitmap consists of 32 bits, and each SLPID group may include up to 32 sleep mode terminals.

Accordingly, when 32 bits of the SLPID group indication bitmap are all set to "1", 1024 sleep mode terminals may check a traffic indication bitmap transmitted through a TRF-IND message.

For example, when a plurality of sleep mode terminals transit to an normal mode and only about 100 terminals remain in a sleep mode, it may occur that the SLPIDs of sleep mode terminals (100 terminals) are uniformly dispersed over 32 bits of the SLPID group indication bitmap.

In other words, when sleep mode terminals transmitted with a buffered DL traffic are dispersed for every bit of the 32-bit SLPID group indication bitmap, the base station sets all the 32-bit of the SLPID group indication bitmap to "1".

In this case, the size of a transfer indication bitmap may generate an overhead as much as the number of SLPID group indication bitmaps set to "1"*32 bits.

Accordingly, in this case, the base station may update the SLPIDs of sleep mode terminals, thereby allowing the maximum number of sleep mode terminals to belong to the same sleep group.

In other words, the base station may prevent the 32-bit of the SLPID group indication bitmap from being simultaneously set to "1" by updating the SLPIDs assigned to terminals, thereby reducing an overhead of the transfer indication bitmap.

The base station may configure and store sleep identifier information currently used by a terminal and sleep identifier information to be newly assigned to the terminal together in a SLP_ID_Update field of the TRF-IND message. Preferably, the sleep identifier information currently used by a terminal and the sleep identifier information to be newly assigned to the terminal may be configured as a pair.

The SLP_ID_Update parameter may be configured with Old_New_SLP_ID in which a sleep identifier (OLD SLPID) currently used by a terminal and a sleep identifier (NEW SLPID) to be newly assigned to the terminal are stored as a pair.

Furthermore, the SLP_ID_Update is a TLV encoding type parameter, and thus it may be included in a TRF-IND message to be transmitted to the terminal.

Next, when the terminal receives a traffic indication message from the base station, the terminal may check whether there is positive traffic indication (for example, through a SLPID group indication bitmap and a traffic indication bitmap or a sleep identifier assigned to the terminal).

When at least one sleep identifier is set to positive traffic indication and a traffic location indicator is set to "1", the base station may transmit a traffic indication message containing a traffic location indicator bitmap to the terminal.

In this case, a traffic location indicator field may instruct whether a terminal indicated by a positive traffic should maintain a sleep mode at the former-half part of the listening window (namely, an interval corresponding to the former part N/2 when the length of the listening window is N).

In other words, the former-half part of the listening window may be defined as the former frames (N/2 section) of the listening window when the length of the listening window is N.

If the terminal receives positive traffic indication during a listening window of the sleep cycle from the base station, then a current sleep cycle (for example, including a listening window) may be reset to a value corresponding to a new sleep cycle flag (NSCF) (for example, twice of an initial sleep cycle, a new initial sleep cycle, or previous sleep cycle) to synchronize the listening windows of sleep mode terminals.

In other words, when the terminal receives positive traffic indication from the base station during the listening window, the terminal may continuously maintain an awake mode, and thus transit to the awake mode as a result.

If the base station transmits positive traffic indication to a specific terminal, then the base station may transmit at least one downlink MAC PDU to the terminal during the listening window.

However, when the terminal receives negative traffic indication from the base station but does not have uplink signaling with the base station or a traffic to be transmitted to the base station, the terminal may terminate the listening window to perform a sleep window operation during the remaining section of the sleep cycle. In other words, the terminal may transit again to a sleep mode.

If the base station transmits negative traffic indication to the terminal, then the base station may not transmit any downlink data traffic to the terminal during the remaining section of the listening window.

Furthermore, when the terminal receives positive traffic indication from the base station but the listening window is not explicitly terminated by a sleep control header (SCH), the terminal waits until the remaining section of the listening window to receive unicast data from the base station.

Hereinafter, a method of updating a sleep identifier of the terminal when a traffic indication message containing an updated sleep identifier provided according to the present disclosure is lost or not detected by the terminal will be described.

Figure 2:
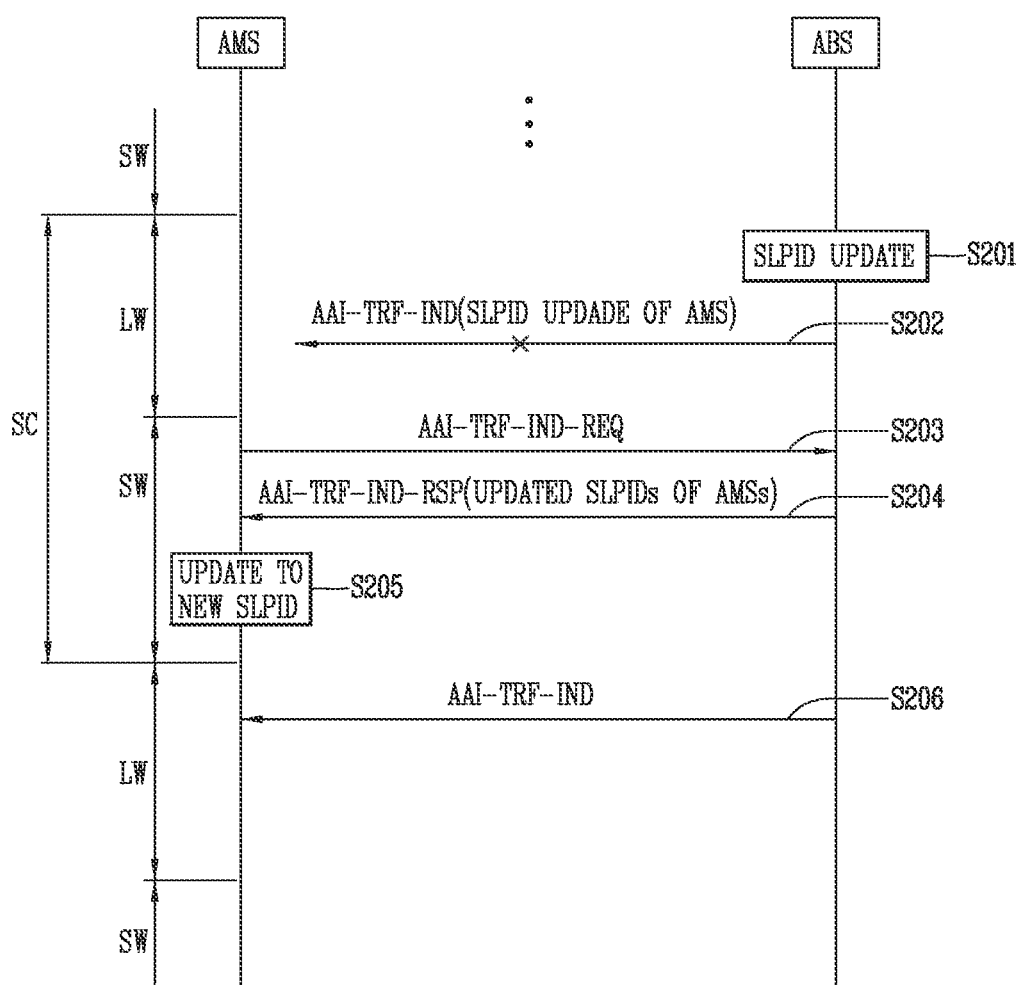
FIG. 2 is a flow chart illustrating a method in which a sleep mode terminal updates a sleep identifier according to an embodiment of the present disclosure.

FIG. 2 is a flow chart illustrating a method in which a sleep mode terminal updates a sleep identifier according to an embodiment of the present disclosure.

First, when a sleep identifier assigned to a sleep mode terminal is updated during a sleep mode entry (S201), the base station transmits a traffic indication message containing the updated sleep identifier to the terminal (S202).

Here, updating a sleep identifier by the base station may occur when there exists an empty sleep identifier (SLPID) in a sleep identifier list having a number less than that of a current sleep identifier of the terminal in a list of whole identifiers managed by the base station as described above.

The empty sleep identifier may correspond to an identifier that has been previously assigned to and used by another terminal but returned to the base station when a mode transition to an awake mode is carried out. If there exist a plurality of empty identifiers, then an identifier having the least number of them may be newly assigned to be updated.

Furthermore, when the SLPIDs of sleep mode terminals are dispersed for each sleep identifier (SLPID) group, the base station may perform sleep identifier update to assign the SLPIDs dispersed for the each SLPID group to the same sleep identifier group.

When a traffic indication message flag (TIMF) is set to "1", the traffic indication message may be transmitted to the terminal in a first frame during the listening window of the sleep mode.

The terminal may maintain an awake state during the remaining section of the listening window when the traffic indication message is lost or not detected.

However, when the terminal is unable to receive any unicast data as well as a traffic indication message from the base station during the listening window, the terminal transmits a traffic indication request message to the base station (S203).

In other words, the terminal may transmit a traffic indication request (TRF-IND-REQ) message to the base station subsequent to a currently set listening window.

However, when the terminal receives unicast data from the base station during the listening window though a traffic indication message transmitted by the base station is lost or not detected by the terminal during the transmission process, the terminal determines the traffic indication as positive.

In other words, when the terminal receives unicast data from the base station during the listening window, the terminal may regard the traffic indication transmitted from the base station as positive, and thus does not transmit a traffic indication request message to the base station.

Hereinafter, it is assumed that the terminal is unable to receive a traffic indication message and any unicast data from the base station during the listening window.

If the base station receives the traffic indication request message from the terminal, then the base station transmits a traffic indication response (TRF-IND-RSP) message containing a size of the next sleep cycle and a start frame number (S204). In other words, the base station may respond to the traffic indication request message by transmitting the traffic indication response message to the terminal.

Here, the traffic indication response message may further include an updated sleep identifier (SLPID) transmitted through the traffic indication message.

In other words, when a sleep identifier is updated and the base station transmits a traffic indication message containing the updated sleep identifier to the terminal, and then receives a traffic indication request message subsequent to the listening window of the sleep cycle from the terminal, the base station transmits a traffic indication response message containing the updated sleep identifier to the terminal.

Furthermore, when the traffic indication message is transmitted and then a sleep identifier is updated again, the base station may transmit a traffic indication response message containing a sleep identifier updated subsequent to transmitting the traffic indication message.

The terminal updates a sleep identifier (OLD SLPID) currently used by the terminal to an new sleep identifier (NEW SLPID) through the traffic indication response message received from the base station (S205).

If the terminal is unable to receive the traffic indication response message from the base station until a timer T43 expires, then the terminal retransmits a traffic indication request message to the base station. The process will be repeated until the terminal successfully receives a traffic indication response message from the base station.

Subsequently, the terminal may be synchronized with the next sleep cycle to perform a sleep mode. In other words, the terminal receives a traffic indication message from the base station in the listening window of the next sleep cycle (S206).

An example of the format of a traffic indication request (AAI-TRF-IND-REQ) message will be described with reference to the following Table 2.

TABLE 2

| Field | Size (bits) | Value/Description | Condition |
|---|---|---|---|
| AAI-TRF-IND-REQ message_format( ){ | | | |
| Control Message Type | 8 | This indicates type of control message is AAI-TRF-IND-REQ message | |

An example of the format of a traffic indication response (AAI-TRF-IND-RSP) message will be described with reference to the following Table 3.

TABLE 3

| Field | Size (bits) | Value/Description | Condition |
|---|---|---|---|
| AAI-TRF_IND-RSP message format( ) { | — | — | |
| Frame_Number | 10 | The least significant 10 bits of the frame number in which incoming LW will start 0~1023 | |
| Sleep Cycle Length | 10 | The length of Sleep Cycle which contains the next scheduled Listening Window. If the AMS receives the traffic indication during the next scheduled Listening Window, the (current) Sleep Cycle shall be set to this value at that time. Value: 0~1023 Sleep Cycle Length = Value + 1 | |

TABLE 3-continued

| Field | Size (bits) | Value/Description | Condition |
|---|---|---|---|
| SLPID | 10 | Updated SLPID. New SLPID to replace the AMS's old SLPID with. When the ABS has sent the AAI-TRF-IND message including SLPID update of the AMS and it receives AAI-TRF-IND-REQ from the AMS, the ABS shall include this parameter in AAI-TRF-IND-RSP. | Shall be included when the SLPID is updated. |
| } | | | |

Referring to Table 3, parameters contained in the traffic indication response (AAI-TRF-IND-RSP) message will be described.

(1) Frame Number

Frame number indicates the most significant 10 bits of the frame number to be started with the next scheduled listening window.

(2) Sleep Cycle Length

Sleep cycle length parameter indicates a length of the sleep cycle including the next scheduled listening window when the sleep cycle becomes twice due to negative traffic indication during the next scheduled listening window.

(3) Sleep Identifier (SLPID)

Sleep identifier indicates an updated sleep identifier. In other words, it indicates a new sleep identifier (NEW SLPID) substituting for a sleep identifier (OLD SLPID) currently used by the terminal.

The updated sleep identifier may be included in a traffic indication response message transmitted to the terminal when the base station transmits a traffic indication message containing the updated sleep identifier and then receives a traffic indication request message from the terminal.

FIG. 3 is a flow chart illustrating an operation method of a terminal for updating a sleep identifier when the terminal according to an embodiment of the present disclosure is unable to receive a traffic indication message.

Hereinafter, it is assumed that the base station transmits a traffic indication message containing a new sleep identifier (NEW SLPID) to the terminal subsequent to updating a sleep identifier assigned to the terminal during a sleep mode entry process.

First, when the terminal is unable to receive a traffic indication message from the base station during a listening window of the sleep mode (S301), the terminal maintains an awake state during the listening window. Here, when the terminal is unable to receive a traffic indication message may be a case where the traffic indication message is lost during its transmission process or not detected at the terminal due to other reasons.

Subsequently, when the terminal is unable to receive any unicast data from the base station during the listening window (S302), the terminal transmits a traffic indication request message to the base station subsequent to the listening window (S303). In other words, when the terminal is unable to receive a traffic indication message and any unicast data from the base station during the listening window of the sleep mode, the terminal transmits a traffic indication request message to the base station subsequent to the listening window.

Next, the terminal receives a traffic indication response message containing updated sleep identification information from the base station (S304). The updated sleep identification information may be configured with a pair of a sleep identifier (OLD SLPID) currently used by the terminal and a new sleep identifier (NEW SLPID).

The terminal extracts an updated sleep identifier (NEW SLPID) from the received traffic indication response message, and then updates the currently used sleep identifier (OLD SLPID) to the updated sleep identifier (NEW SLPID) (S305).

Subsequently, the terminal receives a traffic indication message from the base station during the listening window of the next sleep cycle to check whether there is a traffic transmitted from the base station. In other words, the terminal performs a sleep mode through a traffic indication response message containing the updated sleep identifier.

Figure 4A:
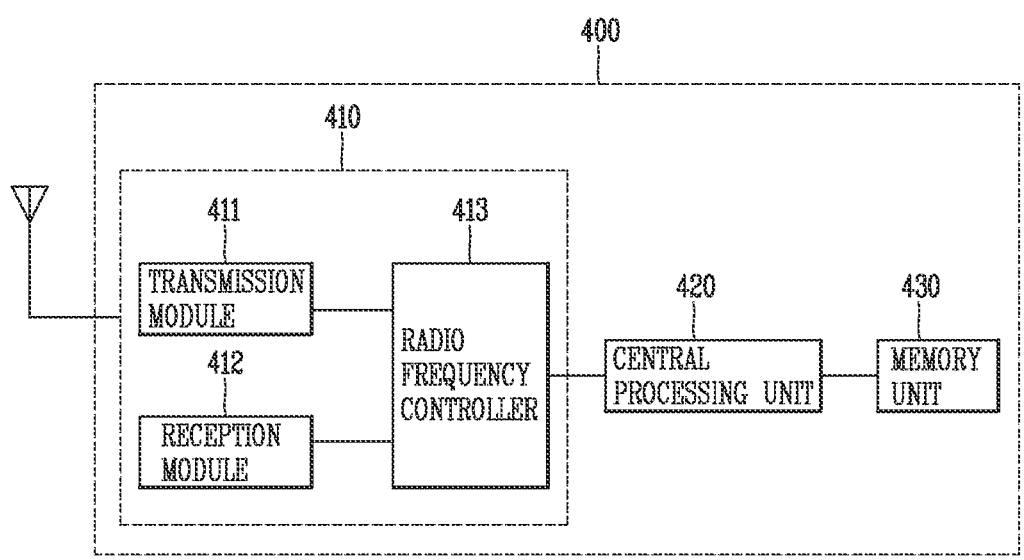
FIG. 4A is an internal block diagram of a terminal or base station according to an embodiment of the present disclosure.

FIG. 4A illustrates an internal block diagram of a terminal or base station according to an embodiment of the present disclosure.

First, a case where the internal block diagram of FIG. 4A corresponds to a terminal will be described.

A terminal 400 may include a central processing unit 420, a memory unit 430, and a radio frequency (RF) unit 410.

The central processing unit 420 typically controls an entire operation of the terminal. In particular, the central processing unit 420 extracts new sleep identification information from a traffic indication response message received through the radio frequency unit to update a sleep identifier previously assigned to the terminal to the extracted new sleep identification information.

Here, the sleep identification information refers to an identifier used to distinguish a terminal in a sleep mode state. In other words, the sleep identification information may be referred to as SLPID.

The memory unit 430 may store a program for the operation of the controller, and temporarily store input/output data.

The radio frequency (RF) unit 410 may transmit and/or receive radio signals to and/or from the outside, and may include a transmission module 411 for transmit radio signals, a reception module 412 for receiving radio signals, and a radio frequency controller 413.

The radio frequency controller 413 may control the reception module to receive a sleep response message containing sleep identification information from the base station during a sleep mode entry process.

Furthermore, the radio frequency controller 413 may control the transmission module to transmit a traffic indication request message to the base station subsequent to the listening window when a traffic indication message and unicast data are not received from the base station during a listening window of the sleep mode. Furthermore, the radio frequency controller 413 may control the reception module to receive a traffic indication response message containing new sleep identification information substituting for current sleep identification information from the base station.

Next, a case where the internal block diagram of FIG. 4A corresponds to a base station will be described.

A base station 400 may include a central processing unit 420, a memory unit 430, and a radio frequency (RF) unit 410.

The central processing unit 420 typically controls an entire operation of the terminal.

The memory unit 430 may store a program for the operation of the controller, and temporarily store input/output data.

The radio frequency (RF) unit 410 may transmit and/or receive radio signals to and/or from the outside, and may include a transmission module 411 for transmit radio signals, a reception module 412 for receiving radio signals, and a radio frequency controller 413.

The radio frequency controller 413 may control the transmission module to receive a sleep response message containing sleep identification information to the terminal during a sleep mode entry process. Furthermore, when the sleep identification information is updated, the radio frequency controller 413 may control the transmission module to transmit a traffic indication message containing the updated sleep identification information during a listening window of the sleep mode.

Furthermore, when a traffic indication request message is received through the reception module from the terminal subsequent to the listening window, the radio frequency controller 413 may control the transmission module to transmit a traffic indication response message containing the updated sleep identification information to the terminal.

Here, the sleep identification information refers to an identifier used to distinguish a terminal in a sleep mode state. In other words, the sleep identification information may be referred to as SLPID.

Figure 4B:
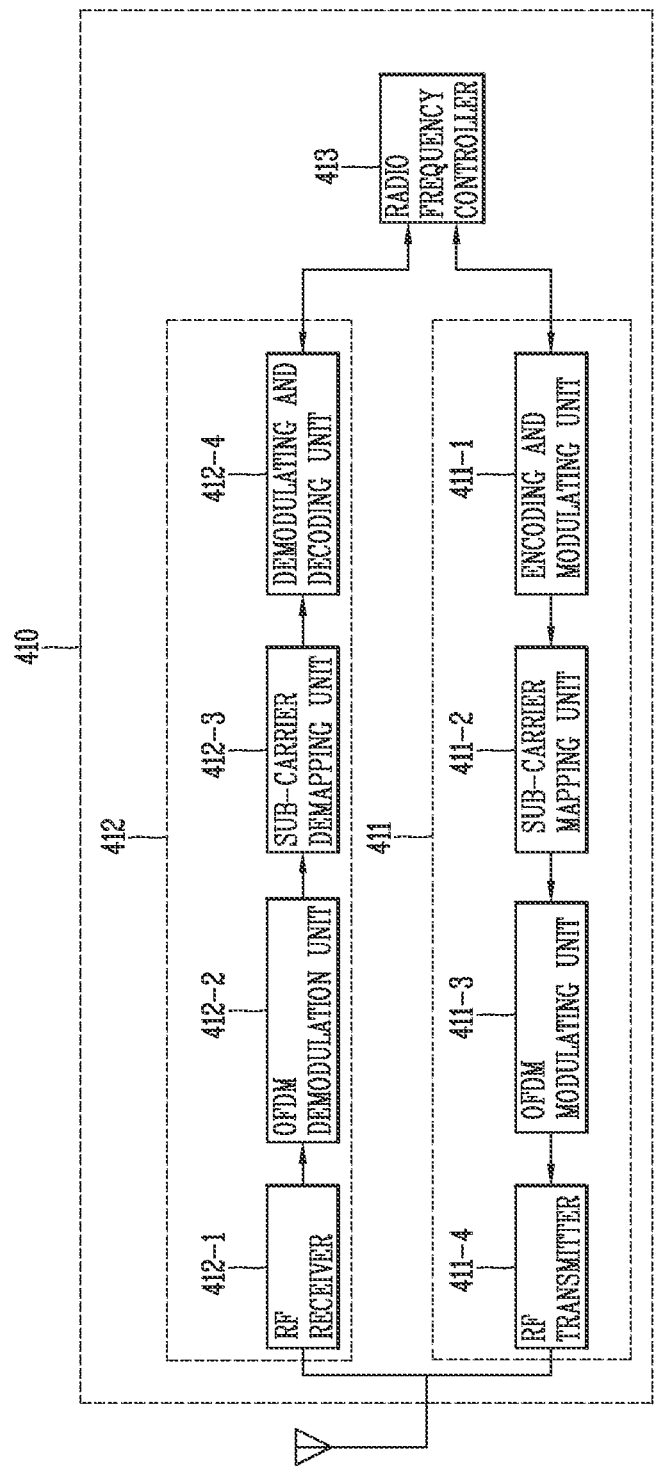
FIG. 4B is a view illustrating the internal block diagram of a radio frequency unit in FIG. 4A.

FIG. 4B is a view illustrating the internal block diagram of a radio frequency unit in FIG. 4A.

As illustrated in FIG. 4B, the transmission module 411 may include a encoding and modulating unit 411-1, a sub-carrier mapping unit 411-2, an OFDM modulating unit 411-3, and a RF transmitter 411-4.

Furthermore, the reception module 412 may include a RF receiver 412-1, an OFDM demodulating unit 412-2, a sub-carrier demapping unit 412-3, and a demodulating and decoding unit 412-4.

First, the RF receiver 412-1 down-converts a RF band signal received through an antenna into a baseband signal. The OFDM demodulating unit 412-2 divides a signal provided from the RF receiver 412-1 into OFDM symbol units, and removes CP, and then restores signals for each sub-carrier through an FFT operation. The sub-carrier demapping unit 412-3 extracts signals to be demodulated and decoded among signals for each sub-carrier provided from the OFDM demodulating unit 412-2. The demodulating and decoding unit 412-4 demodulates and decodes signals provided from the sub-carrier demapping unit 412-3 to convert them into a bit stream.

The encoding and modulating unit 411-1 encodes and modulates a bit stream provided from a data buffer to convert them into complex symbols. The sub-carrier mapping unit 411-2 maps complex symbols provided from the encoding and modulating unit 411-1 to a sub-carrier.

The OFDM modulating unit 411-3 converts signals for each sub-carrier provided from the sub-carrier mapping unit 411-2 through an IFFT operation into a time domain signal, and inserts CP to constitute an OFDM symbol. The RF transmitter 411-4 up-converts a baseband signal provided from the OFDM modulating unit 411-3 into a RF band signal to transmit it through the antenna.

The radio frequency controller for controlling the transmission module and the reception module analyzes a control message of the MAC layer received from the base station to provide it to the central processing unit 420.

Though not shown in FIG. 4B, the data buffer stores data received from the base station and data transmitted to the base station, and outputs data stored under the control of the central processing unit 420 to the encoding and modulating unit 411-1.

What is claimed is:

1. A method for a base station (BS) to support a sleep mode in a broadband mobile communication system, the method comprising:
   transmitting, by the BS to a plurality of terminals in an active mode, a sleep response message comprising a sleep identifications (SLPIDs) so as to cause the plurality of terminals to enter a sleep mode;
   determining whether or not the SLPIDs of the plurality of terminals in the sleep mode are distributed over a plurality of SLPID groups;
   when it is determined that the SLPIDs of the plurality of the terminals in the sleep mode are distributed over the plurality of SLPID groups, updating the SLPIDs by concentrating the SLPIDs of the plurality of the terminals into a minimum number of SLPID groups;
   transmitting, by the BS to the plurality of terminals during a listening window of the sleep mode of the plurality of terminals, a traffic indication message comprising the updated SLPIDs to be applied from a next listening window and an emergency alert indication used to indicate a presence of emergency information for supporting an emergency alert service;
   receiving, by the BS from a specific terminal among the plurality of terminals after the listening window of the sleep mode of the specific terminal, a traffic indication request message which indicates that
      a) the specific terminal has not successfully received the traffic indication message during the listening window, and
      b) the specific terminal has not received any unicast data during the listening window; and
   transmitting, by the BS to the specific terminal in response to the traffic indication request message, a traffic indication response message comprising an updated SLPID although the BS has previously transmitted the traffic indication message including the updated SLPID,
   wherein the traffic indication response message comprises:
      a first field indicating a frame number in a next listening window is to be started, and
      a second field indicating a length of a sleep cycle containing the next listening window.

2. The method of claim 1, wherein the SLPID is an identifier used to distinguish the specific terminal in the sleep mode.

3. The method of claim 1, wherein the updated SLPID comprises a pair of a previous SLPID used by the specific terminal and a new SLPID substituting for the previous SLPID used by the specific terminal.

4. The method of claim 3, wherein the traffic indication response message is transmitted when the SLPID is updated by the BS.

* * * * *